United States Patent
Vossiek et al.

(10) Patent No.: US 11,002,818 B2
(45) Date of Patent: May 11, 2021

(54) SYSTEM AND METHOD USING REFERENCE STATIONS AND A RECEIVING STATION

(71) Applicant: SYMEO GmbH, Neubiberg (DE)

(72) Inventors: Martin Vossiek, Fürth (DE); Peter Gulden, Erding (DE); Fabian Kirsch, Fürth (DE)

(73) Assignee: SYMEO GmbH, Neubiberg (DE)

( * ) Notice: Subject to any disclaimer, the term of this patent is extended or adjusted under 35 U.S.C. 154(b) by 247 days.

(21) Appl. No.: 15/779,768

(22) PCT Filed: Oct. 27, 2016

(86) PCT No.: PCT/EP2016/075969
§ 371 (c)(1),
(2) Date: May 29, 2018

(87) PCT Pub. No.: WO2017/102159
PCT Pub. Date: Jun. 22, 2017

(65) Prior Publication Data
US 2020/0309889 A1  Oct. 1, 2020

(30) Foreign Application Priority Data
Dec. 14, 2015 (DE) .................... 10 2015 121 724.4

(51) Int. Cl.
*G01S 1/20* (2006.01)
*G01S 1/02* (2010.01)
(Continued)

(52) U.S. Cl.
CPC ................ *G01S 1/024* (2013.01); *G01S 1/20* (2013.01); *G01S 5/021* (2013.01); *G01S 5/10* (2013.01); *G01S 5/14* (2013.01)

(58) Field of Classification Search
CPC . G01S 1/024; G01S 1/20; G01S 5/021; G01S 5/10; G01S 5/14; G01S 5/06; G01S 5/02; H04W 64/00
(Continued)

(56) References Cited

U.S. PATENT DOCUMENTS 7,197,022 B2 * 3/2007 Stanwood ............ H04B 7/2615
                                                          370/337
9,763,189 B2 * 9/2017 Ang ..................... H04W 56/001
(Continued)

FOREIGN PATENT DOCUMENTS

DE      101 57 931 C2    12/2003
DE      697 23 587 T2    2/2004
(Continued)

OTHER PUBLICATIONS

European Office Action for corresponding European Patent Application No. 16787480.9 dated Mar. 26, 2020, 7 pages.
(Continued)

*Primary Examiner* — Harry K Liu
(74) *Attorney, Agent, or Firm* — Schwegman Lundberg & Woessner, P.A.

(57) ABSTRACT

A wave-based method has at least two reference stations (1, 2) transmit signals (s1, s2; s3, s4). The signals are transmitted almost at the same time (S1, S2), are transmitted in the same frequency range, and are separable using a multiplexing method. At least one of the sending reference stations (1, 2), besides transmitting its own signal (s1, s2), also receives at least one signal (s2, s1) sent by another reference station (2, 1) at the same time and determines a time stagger (τ1) and/or a phase angle between its own transmission and the reception with high precision. At least one receiving station (7) which at least receives the signals (s1, s2) receives the (Continued)

signals (s3, s4) from at least two of the reference stations (1, 2). A system and stations perform the wave-based method.

20 Claims, 1 Drawing Sheet

(51) Int. Cl.
*G01S 5/02* (2010.01)
*G01S 5/10* (2006.01)
*G01S 5/14* (2006.01)

(58) Field of Classification Search
USPC .......................................................... 342/387
See application file for complete search history.

(56) References Cited

U.S. PATENT DOCUMENTS

| | | | |
|---|---|---|---|
| 2007/0230434 A1* | 10/2007 | Thill | H04J 3/0664 370/350 |
| 2012/0252503 A1 | 10/2012 | Wu | |
| 2013/0051434 A1* | 2/2013 | Draganov | G01S 5/0273 375/148 |
| 2015/0050907 A1* | 2/2015 | Rudow | H04W 4/023 455/404.2 |

FOREIGN PATENT DOCUMENTS

| | | |
|---|---|---|
| DE | 10 2006 040 497 A1 | 3/2008 |
| DE | 10 2007 043 649 A1 | 7/2009 |
| DE | 10 2008 010 536 A1 | 8/2009 |
| EP | 2 653 886 A1 | 10/2013 |
| WO | WO-2017102159 A1 | 6/2017 |

OTHER PUBLICATIONS

International Search Report and Written Opinion of the International Searching Authority for International Patent Application No. PCT/EP2016/075969 dated Jan. 30, 2017, 16 pages.

German Search Report for German Patent Application No. 10 2015 121 724.4 dated Aug. 29, 2016, 10 pages.

Roehr, S. et al., "Method for High Precision Radar Distance Measurement and Synchronization of Wireless Units", IEEE/MTT-S International, Microwave Symposium, 1315-1318 (2007).

Roehr, S. et al., "Wireless local positioning—existing solutions and novel system concepts", 2015 IEEE MTT-S International Conference on Microwaves for Intelligent Mobility, 1-4 (2015).

"International Application Serial No. PCT/EP2016/065969, International Preliminary Report on Patentability dated Jun. 28, 2018", 20 pgs.

* cited by examiner

SYSTEM AND METHOD USING REFERENCE STATIONS AND A RECEIVING STATION

This application is a National Stage Application of PCT/EP2016/075969, filed 27 Oct. 2016, which claims benefit of Serial No. 10 2015 121 724.4, filed 14 Dec. 2015 in Germany and which applications are incorporated herein by reference. To the extent appropriate, a claim of priority is made to each of the above-disclosed applications.

BACKGROUND OF THE INVENTION

The invention relates to a system and a method with stations receiving at least three signals. The invention relates in particular to an arrangement and a method for calculating time offsets in wireless systems or for calculating positions.

Radiolocation systems can utilise different measurement variables. Known measurement variables are, for example, an angle measurement, time of arrival measurement, or field strength measurements. Time of arrival measurements (TOA) are frequently encountered in the field of high-precision systems. However, due to the very quick speed of light, an extremely precise synchronisation of the stations involved is necessary. Otherwise, even small time errors will lead to large measurement errors with regard to distance in systems which determine positions. A synchronisation of the stations is thus a key problem closely linked to radiolocation. The problem has been mitigated in part by assessing only time differences of arrival (TDOA). Although this reduces the locating accuracy depending on the situation, a precise synchronisation between a mobile station and stationary stations is no longer necessary.

The remaining problem of synchronising the stationary stations with one another has been solved in the past in different ways:

One method lies in that a glass fibre network provides a time reference over the entire system.

Another method lies in fixing an additional "mobile" node at a known location. The clock deviations are determined from the measurement of the times of arrival at this node and the known distances.

Yet another method lies in that one of the stationary stations emits a synchronisation signal in each measurement cycle. The other stationary stations synchronise themselves with this.

The first solution is very complex with regard to its installation and is costly with regard to the capital investment in the glass fibre network. The other two solutions are based on basic assumptions that limit the potential precision:

Radio channels used for synchronisation must have a clear line of sight.

Any multipaths additionally occurring must have a sufficient path length difference in order to be separable from the line of sight with the available bandwidth.

The length of the line of sight must be known.

Clocks of the stationary stations are assumed to have an absolutely precise timing rate in a time between synchronisation and measurement.

The transfer of a system clock to a signal generation within a station is assumed to be ideal and fault-free.

Any deviation from these idealised assumptions will result in a synchronisation error and therefore in a falsified measurement. A systematic deviation from these assumptions can lead to a systematic measurement error that cannot be remedied, not even by subsequent statistical compensation methods.

Furthermore, the precision achieved by previous methods is insufficient to perform phase-coherent measurements.

A pre-synchronisation with an accuracy that makes it possible to separate various transmitters in iFDMA is known in general from S. Roehr, M. Vossiek, P. Gulden, "Method for High Precision Radar Distance Measurement and Synchronization of Wireless Units," 2007 IEEE MTT-S International Microwave Symposium, Honolulu, USA, June 2007, pp. 1315-1318.

SUMMARY OF THE INVENTION

The object of the invention is to further develop a system and a method with stations exchanging at least three signals. In particular, a measurement accuracy, in particular a time accuracy of the measurement of signal times of arrival in the radio channel, are to be improved.

Accordingly, what is preferred is a wave-based method in which at least two reference stations transmit signals, wherein the signals are transmitted almost at the same time, are transmitted in the same frequency range, are separable using a multiplexing method, wherein at least one of the reference stations, besides transmitting its own signal, also receives at least one signal sent by another reference station at the same time and determines a time stagger and/or a phase angle between its own transmission and the reception with high precision, and wherein at least one receiving station which at least receives the signals receives the signals from at least two of the reference stations.

The wave-based method is, in particular, a method for determining a position of the at least one station which at least receives the signals or comprises a method step for determining the position of the at least one station which at least receives the signals. The same transmission of a signal can be used (consulted) both for locating and for synchronisation (by reception and further processing of at least one of the reference stations). At least one of the reference stations can send a signal for locating purposes to the at least one station which at least receives the signals (wherein this signal can be further processed there accordingly) and, as appropriate, can additionally determine a time stagger and/or a phase angle between this (its own) transmission and the reception from a further reference station. For example, there thus should be no time stagger (time difference) determined in this step (although this optionally can be provided in addition) between the reception of two signals from two different reference stations at the at least one station which at least receives the signals, but instead a time offset (time stagger) or a phase angle between the reference station's own transmission and the reception of the signal of a further reference station. The time offset or the phase angle is preferably determined directly by the reference station (independently). In particular, it is not necessary for a further (additional) measurement device to be provided in order to determine the aforesaid stagger or the aforesaid phase angle. One, more, or all reference stations are preferably stationary (immobile) and/or the at least one station which at least receives the signals is preferably mobile.

The term "wave-based" is to be understood in particular to mean that the signals used in the method or a corresponding system are signals transferred between stations in wave form. In particular, the signals are electromagnetic waves, which preferably are transferred in a conductorless manner, i.e. without a wave guide via air interfaces. The signals transferred in wave form are preferably radio signals, in particular in a range of from 500 MHz to 1 THz.

In particular, the terms "reference station" and "receiving station" are used to distinguish between stations that act and operate differently for the sequence of the procedure.

Stationary reference stations are preferred. Here, "stationary" shall be understood in particular to mean also reference stations that move over known trajectories. Such movements are performed here in particular along known place-time profiles, such that, at any time relevant for measurements, the position, inclusive of spatial orientation, of a movable reference station of this kind is known.

The at least one station which at least receives the signals can preferably also transmit signals itself and/or communicate with the reference stations, i.e. exchange signals including data and information. The receiving station is in particular a mobile station. A mobile station of this kind can preferably move freely in space, wherein the momentary position thereof, inclusive of orientation, does not have to be known.

Signals can have only a temporally predefined profile. Signals in the form of a ramp are preferred. Signals can alternatively or additionally also contain data and information which are exchanged between two or more of the various stations.

In particular, all transmissions of a station that are at a lower frequency fall under a transmission in the same frequency range, whereas the transmissions of another station are all at a higher frequency. This is true in particular for an arrangement in which there is no conceivable constant separating frequency.

The term "high-precision" is understood in particular to mean more precise than 1 μs. 1 μs can be achieved currently with standard methods, for example FSK or with ZigBee modules, wherein for future applications an even higher demand on the precision, in particular more precise than 0.1 μs, in particular more precise than 0.001 μs, is also to be enabled by a synchronisation.

A preferred embodiment is a method in which a computing and/or control unit, which is not part of a receiving station of this kind, processes at least one of the defined time staggers and phase angles to form a data stream or data set, which is transferred to the at least one receiving station by data transfer.

The data transfer can also be performed here on a different path and/or medium from the signals or ramps.

A preferred embodiment is a method in which, by means of at least one receiving station or reference station, at least one of the time stagger and the phase angle of at least one signal that is or has been received by another station, including receiving station and reference stations, is determined.

The determination is performed in particular by FMCW, OFDM, or pseudo-noise coding.

A preferred embodiment is a method in which measurement values determined from received signals are processed by at least three different receiving stations such that a mathematical variable is created, wherein the system times of these stations with linear approximation have no influence on the time of arrival differences from the received signals.

The expression "with approximation" shall be understood to mean that the Taylor series n is interrupted at the quadratic polynomial. The calculation is performed in particular in that times of arrival or phases are added and subtracted with suitable weights. The mathematical variables are in particular path lengths and path length differences.

With approximation, in accordance with a preferred embodiment, the Taylor series n is interrupted at the quadratic polynomial, wherein the calculation is performed in particular in that times of arrival or phases are added and subtracted with weights and in particular the mathematical variables are path lengths and path length differences.

A preferred embodiment is a method in which measurement values determined from received signals/the measurement values from at least three different receiving stations are calculated in accordance with:

$$\tau_{m,k_1,k_2}(t) = (\tau_{k_1 \to m}(t) - \tau_{k_2 \to m}(t)) + \frac{1}{2}(\tau_{k_2 \to k_1}(t) - \tau_{k_1 \to k_2}(t)) \quad (1.2)$$

A preferred embodiment is a method in which, with use of more than three stations, measurement values determined from received signals/the measurement values from at least three different receiving stations are calculated in accordance with:

$$\begin{pmatrix} clk_1(t) + T_0 \\ clk_2(t) + T_0 \\ \vdots \\ clk_N(t) + T_0 \end{pmatrix} = A(t) \begin{pmatrix} \tau_{1 \to 2}(t) \\ \tau_{1 \to 3}(t) \\ \vdots \\ \tau_{2 \to 1}(t) \\ \tau_{2 \to 3}(t) \\ \vdots \\ \tau_{N \to (N-1)}(t) \end{pmatrix}, \quad (1.5)$$

in particular in accordance with:

$$clk_k(t) + T_0 = \frac{1}{2N}\left(\sum_{k' \neq k} \tau_{k' \to k}(t) - \sum_{k' \neq k} \tau_{k \to k'}(t)\right) \quad (1.7)$$

A preferred embodiment is a method in which a clock offset of the receiving station is determined relative to at least one of the reference stations.

A preferred embodiment is a method in which FMCW or FSCW signals are used or formed as the sent signals.

A preferred embodiment is a method in which IFMDA or CDMA is applied as multiplexing method.

A preferred embodiment is a method in which future transmissions of the reference stations are controlled depending on the defined time staggers (τ1) and/or phase angles.

A preferred embodiment is a method in which a transmission at the same time or almost at the same time is performed as a temporally overlapping sending operation or sending operation between two transmissions of a station with a rest time shorter than the duration of the channel pulse response. A temporal overlap can preferably be at least 10%, more preferably at least 25%, even more preferably at least half (50%) of the duration of the earlier or earliest signal of the plurality of (for example two) signals.

A preferred embodiment is a wave-based system with at least two reference stations, which transmit signals and which each have at least one computing and/or control unit, and at least one receiving station which at least receives the signals from at least two of the reference stations and comprises the at least one computing and/or control unit, wherein the computing and/or control units are configured or designed to each perform at least some of the method steps of the above-described method and as a whole to perform the entire method.

A computing and/or control unit configured or designed in this way is in particular a processor with associated components, such as at least one integrated or connected memory for storing or buffering program codes for carrying out the method, and signals and data for this purpose.

A preferred embodiment is a reference station or receiving station that is configured or designed as a component of a system of this kind or that is configured or designed to carry out a method of this kind.

A preferred embodiment is a receiving station of this kind that is a mobile station with a movement path, wherein the movement path in particular is not fixed.

A preferred embodiment is a reference station with a/the computing and/or control unit, which controls future transmissions of the reference stations depending on the defined time staggers and/or phase angles.

An improved method for synthetic synchronisation of pseudolites in ITDOA (inverse time difference of arrival) positioning systems is thus provided. In particular, a system with an arrangement of reference stations and at least one mobile station and also a method for calculating time offsets in wireless systems or for calculating positions with significantly reduced influence of time offsets are provided. Phase-coherent measurements are additionally enabled. The system—in particular a corresponding arrangement of stations—and the method for calculating time offsets in radio systems or for calculating positions enable a significantly reduced influence of time offsets.

The system and the method eliminate—apart from the free line of sight—the basic assumptions mentioned in the introduction and thus enable a significant improvement of a locating procedure. By virtue of the method, the need for direct high-precision synchronisation is spared. Even phase-coherent measurements are made possible.

The two last-mentioned basic assumptions are unnecessary since the same transmission is used or can be used both for the synchronisation and for the locating. Thus, the relation of the system clocks is not determined indirectly by radio signals and used as a basis to determine the next signals, but instead the time reference of the various transmissions relevant for the locating are determined directly.

The third basic assumption, i.e. knowing the length of the line of sight, is unnecessary since the time stagger between two of the reference stations is measured simultaneously from both stations at the same time during the same transmission. If the momentary distance now deviates from the assumed distance, this has an exactly opposite effect on both time stagger measurements. If the total evaluation for determining the clock drifts equally weights both measurements from the first to the second reference station and vice versa, the drift does not spread as a result of imprecise distance assumptions in the synchronisation.

The second basic assumption, i.e. occurring multipaths with a sufficient path length difference, is unnecessary since the measurement of the time offset between two of the reference stations is performed or can be performed in both directions at the same time with the same centre frequency. If a multipath in a certain bandwidth cannot be separated from the main path, it can both shorten and extend the apparent path length of the main path.

That which occurs in the last-mentioned case, i.e. that a multipath cannot be separated from the main field, and the extent to which this occurs is dependent on the following variables:
an accurate path length difference between main path and multipath,
an amplitude ratio between both paths,
a used centre frequency
a used bandwidth,
a spectral power distribution of a used RF signal (RF: high frequency), and
the choice of a window function on the reception side, i.e. in particular at the receiving station and the reference stations during their reception.

Each of these influencing factors or variables is effective, with appropriate processing, at two points, such that the total effect is cancelled in the end product. The known influences will firstly be considered structurally, and it will then be described individually for said influences how they are prevented from affecting the end result. To this end, an equipollent effect on the two measurements of the same path is confirmed in each case.

Of the variables, the two first variables are channel-dependent. With simultaneous measurement, both measurements take place in particular in the same channel. The third to fifth variables are in particular selected to be the same for both measurements. In this way, the apparent change in path length for both measurements is the same and, as presented beforehand, does not have any effect on the determined clock deviations.

A suitable multiplexing method is used for the simultaneous measurement with a plurality of sending stations. Various methods will be assessed hereinafter in an exemplary manner in respect of their applicability:

In the case of TDMA (time division multiple access), the stations do not send absolutely at the same time, but at staggered times. So that the two first-mentioned variables do not occasionally change in the channel, the application environment is evaluated and a time stagger is kept sufficiently small. In particular in mobile scenarios, this rarely occurs, since the first variable already experiences shifts by fragments of the wavelength. Here, the term "sufficiently small" means that the system has moved at most by a tenth of the wavelength within the time in which the measurement was first performed in one direction and then in the other direction.

In the case of FDMA (frequency division multiple access), the centre frequencies are shifted relative to one another to such an extent that the used sub-bands no longer overlap with one another. However, the wavelength also changes, and thus the third variable is significantly changed. The use of FDMA is therefore not preferred. However, this restriction does not apply for modern methods in the frequency range such as OFDMA.

In the case of OFDMA (orthogonal frequency division multiple access), various carriers of an OFDM system are assigned various senders exclusively. As a result, the transmissions of the stations can be very finely fitted in the frequency range. The fitting is selected to be fine enough to make all features of the channel in the frequency range visible to each sender. Otherwise, the fifth variable would be compromised. A fitting that is selected to be fine enough is in particular a fitting in which a carrier frequency lies within a sub-band. Here, the sub-band is selected such that it corresponds at most to the inverse of the delay spread of the channel.

In the case of a particularly preferred IFDMA (intermediate frequency division multiple access), FMCW signals for example are varied such that they fall within various sub-bands in the IF range (IF: intermediate frequency) of the receivers. The signals are thus separable, without influencing any of the above-mentioned variables.

In the case of a, likewise particularly preferred CDMA (code division multiple access), the transmission is mixed with a station-specific broadband pseudo-noise sequence. By renewed mixing in the receiver, a specific signal is singled out again from the resultant signal blanket. The signals are thus separable without influencing any of the above variables.

BRIEF DESCRIPTION OF THE DRAWINGS

An exemplary embodiment will be explained in greater detail hereinafter with reference to the drawing. Like reference signs in the various figures refer here to like or similarly acting components, signals or method steps, and therefore the comments provided are also applicable to the other figure. In the drawing.

DETAILED DESCRIPTION OF THE PREFERRED EMBODIMENT

Figure 1:
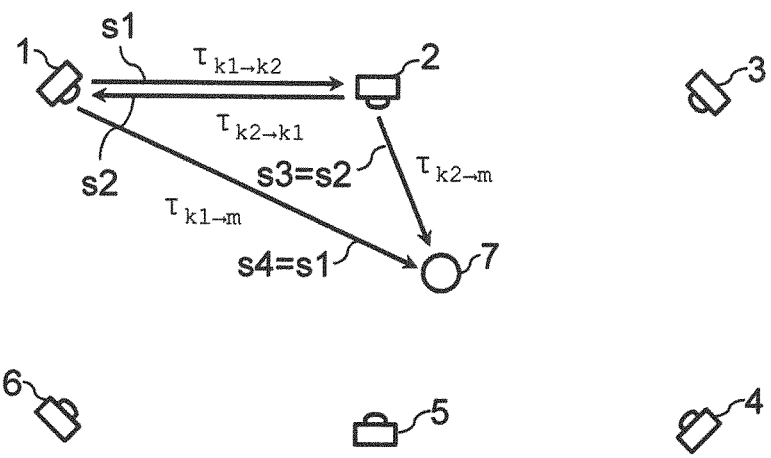
FIG. 1 shows an arrangement with one receiving station and six stationary stations.
Figure 2:
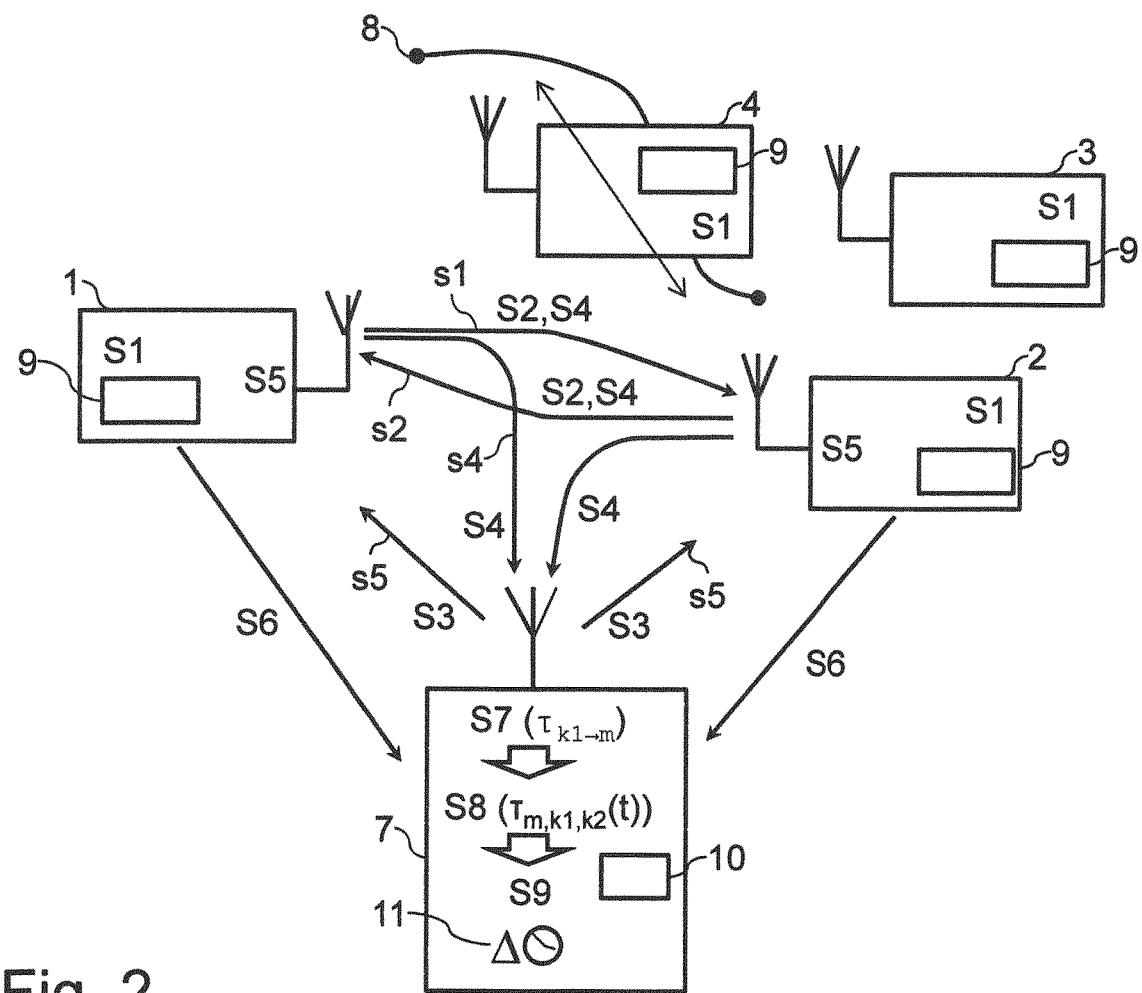
FIG. 2 shows a further arrangement for explaining method steps with one receiving station and four stationary stations.

As can be seen from FIG. 1 and FIG. 2, an exemplary arrangement or a system formed therefrom has at least two, here for example six, stationary stations, which are also referred to as reference stations 1-6, merely in order to provide a conceptual distinction. The first of the reference stations 1 sends, in particular, a first signal s1 to at least the second of the reference stations 2. The second of the reference stations 2 sends, in particular, a second signal s2 to at least the first of the reference stations 1.

These signals s1, s2 of the first reference station 1 and of the second reference station 2 can be received by at least one receiving station 7 and are used after having been received by this receiving station 7. For distinction, the signals s1, s2 received here by the receiving station 7 are also used with the reference signs s3 and s4. The term "receiving station 7" is used here merely to provide conceptual distinction with respect to the reference stations 1-6. In particular, the receiving station 7 can also itself be formed as a station that also sends signals. In particular, the receiving station 7 is formed as a mobile station.

To present this by way of formulas, the reference stations 1-6 are also denoted by the letters $k_1, k_2, \ldots k_6$, and the receiving station 7 is denoted by m.

Depending on the choice in particular of one of the above-mentioned multiplexing methods, any stationary reference station k or k1-k6 and/or mobile station m can continuously determine the pseudo time offsets defined in its reception signal and phase angles relative to all stationary, i.e. sending stations k. Here, these are, for example, $\tau_{k2 \to k1}$ as time stagger between the first two stations k1 and k2; The time stagger includes, here, the clock offset between the stations and the measured time of arrival. $\tau_{k2 \to k1}$ as time stagger in the reverse sending direction between the first two reference stations k2 and k1; $\tau_{k1 \to m}$ as time stagger between the first reference station k1 and the receiving station m, and $\tau_{k2 \to m}$ as time stagger between the second reference station k2 and the receiving station m. The same is true for the various $\varphi_{k \to m}$ as phase between stations, for example k and m, and $\Delta\varphi_{k \to m}(t)$ as phase difference or phase position between stations, for example k and m at time t.

The determination is performed in particular in accordance with $$\tau_{k \to m}(t) = clk_m(t) - clk_k(t) + c_0^{-1} \tilde{d}_{k,m}(t) \quad (1.1)$$

$$\Delta\varphi_{k \to m}(t) = \varphi_{LO,m}(t) - \varphi_{LO,k}(t) + \frac{2\pi}{\lambda} \tilde{d}_{k,m}(t)$$

Here, $\tilde{d}_{k,m}(t)$ denotes a distance, possibly distorted by multipaths, in the radio channel between the stations k and m at time t. In addition, $clk_k(t)$ denotes the system time within the signal production unit of the station k at time t. $\varphi_{LO,k}(t)$ denotes the phase position of the local oscillator in a signal production unit of the station k at the time t. From these values, the time of arrival difference between the paths $k_1 \to m$, $k_2 \to m$ between the first reference station 1; k1 and the second reference station 2; k2 respectively and the receiving station 7; m can be calculated. This is provided in particular by means of $$\tau_{m,k_1,k_2}(t) = (\tau_{k_1 \to m}(t) - \tau_{k_2 \to m}(t)) + \frac{1}{2}(\tau_{k_2 \to k_1}(t) - \tau_{k_1 \to k_2}(t)) \quad (1.2)$$

The expression in brackets is introduced in order to assign the errors produced by different clocks half to one of the two transmission paths and half to the other of the two transmission paths.

If the clocks involved were ideally synchronous, the first bracketed expression here would already be the desired time of arrival difference, and the second bracketed expression would give zero on account of the channel symmetry. If the deviations of the actual clocks now come into play, it can be seen that these do not influence the calculation value, since the influence of the clock error is cancelled out over the first and second expression. The second expression thus always forms the necessary corrections for clock errors in the first expression. The calculated value $\tau_{m, k_1, k_2}(t)$ lastly constitutes the distance difference of the mobile station to both stationary stations—i.e. the receiving station 7 and the reference stations 1, 2; $k_1, k_2$—but without influence of the involved clocks and the channel properties between the two stationary stations.

$$\tau_{m,k_1,k_2}(t) = c_0^{-1}\left(\tilde{d}_{k_1,m}(t) - \tilde{d}_{k_2,m}(t)\right) \quad (1.3)$$

Multipaths between the mobile station 7; m and the stationary reference stations 1, 2; $k_1, k_2$ are just as influential as in any other kind of synchronisation, but the other influences are practically eradicated.

It is of great advantage that, besides the TDOA time of arrival measurement, TDOA phase measurements are now also available. This opens the door for the first time to beneficial coherent evaluation methods.

The following is therefore preferably calculated:

$$\Delta\varphi_{m,k_1,k_2}(t) = \quad (1.4)$$

$$\left(\Delta\varphi_{k_1 \to m}(t) - \Delta\varphi_{k_2 \to m}(t)\right) + \frac{1}{2}\left(\Delta\varphi_{k_2 \to k_1}(t) - \Delta\varphi_{k_1 \to k_2}(t)\right)$$

This value $\Delta\varphi_{m, k_1, k_2}(t)$ constitutes the phase difference of the two relevant paths, without being dependent on the phase angles of the involved oscillators. Here, there can be 180-degree phase jumps depending on the implementation. A phase noise of the involved stations m, $k_1$, $k_2$ should still be good enough to be able to actually take a measurement, however the accuracy of the value used ultimately is dependent merely on the receiver noise. Improved oscillators will extend the integration times that can be provided here and in this way influence the accuracy of the phase angles of the involved oscillators $\Delta\varphi_{m,k_1,k_2}(t)$, however there is no longer a direct adverse effect resulting from the phase noise.

The same principle can be used advantageously by an alternative data flow with other calculation steps. To this end, the time stagger $\tau_{1\to2}$, $\tau_{1\to3}$, $\tau_{1\text{-}4}$, ... $\tau_{2\to2}$, $\tau T_{2\to3}$, ... $\tau_{N\to(N\text{-}1)}$ with N being the highest number of reference stations, is determined centrally from the measurements of the reference stations:

$$\begin{pmatrix} clk_1(t) + T_0 \\ clk_2(t) + T_0 \\ \vdots \\ clk_N(t) + T_0 \end{pmatrix} = A(t) \begin{pmatrix} \tau_{1\to 2}(t) \\ \tau_{1\to 3}(t) \\ \vdots \\ \tau_{2\to 1}(t) \\ \tau_{2\to 3}(t) \\ \vdots \\ \tau_{N\to(N-1)}(t) \end{pmatrix} \quad (1.5)$$

All clocks or clock errors apart from an offset (stagger) are hereby determined at a central point.

A matrix A(t) necessary for this purpose is designed such that the values $\vartheta_{k,m}(t)$ act in the core of A(t) and therefore have no influence on the ascertained values. The remaining degrees of freedom of A(t) can be used to minimise any spread of the error of the receiver noise.

A possible matrix A(t) for the case in which all measurements are present would be:

$$A(t) = \frac{1}{2N} \quad (1.6)$$

$$\begin{pmatrix} -1 & \ldots & -1 & 1,0 & \ldots & 0 & 1 & 0 & \ldots & 1 & 0 & \ldots \\ 1,0,0 & \ldots & 0 & -1,-1 & \ldots & -1 & 0,1,0 & & & & & \\ 0,1,0 & \ldots & 0 & 0,1,0 & \ldots & 0 & 0,0,1 & & & & & \\ & \ldots & 0 & & & & & & & & & \end{pmatrix}$$

Thus, (1.5) assumes the following form:

$$clk_k(t) + T_0 = \frac{1}{2N}\left(\sum_{k'\neq k}\tau_{k'\to k}(t) - \sum_{k'\neq k}\tau_{k\to k'}(t)\right) \quad (1.7)$$

Here, T0 stands for an offset or stagger relative to an arbitrary start time of the measurement. The offset is not relevant for the further calculations, since these require only the differences between the stations. This data can then be made available via radio data transmission, for example ZigBee, WLAN (wireless local area network) or GSM (mobile communication standard) to the one or more mobile stations m. Such mobile stations m then calculate:

$$\tau_{m,k_1,k_2}(t)=(\tau_{k_1\to m}(t)-\tau_{k_2\to m}(t))+(clk_{k_1}(t)-clk_{k_2}(t)) \quad (1.8)$$

Under consideration of the previous special case, in which only two stationary stations $k_1$ and $k_2$ are initially evaluated, A(t) from (1.6) thus becomes a 2×2 matrix and (1.5) becomes $$\begin{pmatrix} clk_{k1}(t) + T_0 \\ clk_{k2}(t) + T_0 \end{pmatrix} = \frac{1}{4}\begin{pmatrix} -1 & 1 \\ 1 & -1 \end{pmatrix}\begin{pmatrix} \tau_{k1\to k2}(t) \\ \tau_{k2\to k1}(t) \end{pmatrix} \quad (1.9)$$

For this special case:

$$clk_{k1}(t) - clk_{k2}(t) = \frac{1}{2}(\tau_{k2\to k1}(t) - \tau_{k1\to k2}(t)) \quad (1.10)$$

The equivalence between (1.8) and (1.2) is thus evident.
A centralised calculation of this kind is also possible for the phases:

$$\begin{pmatrix} \varphi_{LO,1}(t) + \varphi_0 \\ \varphi_{LO,2}(t) + \varphi_0 \\ \vdots \\ \varphi_{LO,N}(t) + \varphi_0 \end{pmatrix} = A(t) \begin{pmatrix} \Delta\varphi_{1\to 2}(t) \\ \Delta\varphi_{1\to 3}(t) \\ \vdots \\ \Delta\varphi_{2\to 1}(t) \\ \Delta\varphi_{2\to 3}(t) \\ \vdots \\ \Delta\varphi_{N\to(N-1)}(t) \end{pmatrix} \quad (0.1)$$

$\varphi_0$ denotes the phase offset relative to an observer. Here, the phase offset is the same for all stations and is therefore irrelevant, since in further steps the differences of the individual stations are used.

The input data along the time axis are preferably subjected to an unwrapping (unwrapped phase, i.e. phase presented over 360°, continuously beyond the period), since jumps by 360 degrees could lead, as a result of the non-integer effect of A(t), to phase jumps with significant angles. Alternatively, evaluations according to (1.4) can also be used in order to remove the ambiguity.

These data can then be made available via radio data transmission, for example ZigBee, WLAN or GSM, to the mobile stations 7; m. The mobile stations 7; m then calculate:

$$\Delta\varphi_{m,k_1,k_2}(t)=(\Delta\varphi_{k_1\to m}(t)-\Delta\varphi_{k_2\to m}(t))+(\varphi_{LO,1}(t)-\varphi_{LO,2}(t)) \quad (1.12)$$

Depending on the embodiment of the system, it is conceivable that the phases $\varphi_{k1\to m1\ or\ k2\to m2\ or\ k1\to k2\ or\ k2\to k1}$ of the received signals also change during a measurement process. This evaluation can then be applied for individual time portions of the exchanged signals. This can be implemented well with existing architectures, especially in the case of FMCW, as follows. In the case of an FMCW-based application, this calculation will also be performed continuously within a ramp. Such ramps are produced by the reference stations 1-6; k and the receiving station 7; m, and sent at least from the reference stations as the signals s1, s2; or s3, s4. To this end, the beat signal obtained in the particular receiver is firstly filtered by a software bandpass filter. This bandpass filter is tailored in terms of its passband to the frequency range to be anticipated by the application. The above-mentioned addition of the phases can then be achieved continuously by a complex multiplication of the corresponding beat signals. The halving of the phase $\varphi_{k1\to m1\ or\ k2\to m2\ or\ k1\to k2\ or\ k2\to k1}$ of the received signal (s) $S_{k1\to m1\ or\ k2\to m2\ or\ k1\to k2\ or\ k2\to k1}$ can be realised in one way by a complex square root, wherein the correct sign must be selected in each case, such that the resultant beat signal $S_{k1\to m1\ or\ k2\to m2\ or\ k1\to k2\ or\ k2\to k1}$ of the station (s) 1-6 u, k and of the receiving station 7; m remains continuously. In accordance with another way, the total phase term is doubled, to give the following:

$$2 \cdot \Delta\varphi_{m,k_1,k_2}(t) = 2 \cdot (\Delta\varphi_{k_1 \to m}(t) - \Delta\varphi_{k_2 \to m}(t)) + (\Delta\varphi_{k_2 \to k_1}(t) - \Delta\varphi_{k_1 \to k_2}(t)) \quad (1.13)$$

Since, due to the complex multiplication of the beat signals, the time range is folded, many additional targets are created in this way. They are much weaker than the peak produced by the line of sight, but are numerous. Conversely, the phase noise within a measurement is eliminated by the continuous phase evaluation, and therefore the individual peaks can no longer be widened by the phase noise of the involved oscillators.

In particular, FIG. 2 shows an exemplary course for example in an FMCW-based embodiment. The method steps are performed here optionally partially in parallel or in a modified order. A trajectory 8, i.e. a movement path of one of the reference stations 4 known in terms of space and time is additionally shown, such that the reference station 4 likewise can be considered to be stationary by means of a corresponding extension of the calculation. Computing and/or control units 9, 10 are additionally shown, in which calculations for carrying out the method are performed. A clock offset 11 that is to be compensated is likewise shown.

In a first method step S1, all stations, i.e. all reference stations k; 1-2- . . . N involved subsequently and all involved receiving stations/; m are pre-synchronised by a known method: LPR according to U.S. Pat. No. 7,940,743, Cherrysync according to US2009222589.

In a second method step S2, all stationary or reference stations k; 1-2 send an FMCW ramp with a gradient of, merely by way of example, 1 GHz/1 ms in the 61 GHz band in the form of the signal s1, s2 or s3, s4 at an agreed time. Here, there is a station-specific offset in a (purely by way of example) 250 kHz grid. Gradients can lie in the range of from, in particular, 100 MHz in 100 ms to 10 GHz in 100 μs, the band can lie in the range of from, in particular, 2.4 to 240 GHz, and the grid can lie in the range of from, in particular, 5 kHz to 500 MHz.

In a third method step S3 all mobile or receiving stations 7, by means of their local oscillator, likewise send a ramp with this gradient at the same time. The expression "at the same time" is to be understood to mean a time within which all ramps fall within the receiving window of the other stations. This is satisfied in particular with a maximum deviation of half a ramp or less.

In a fourth method step S4, both the stationary and mobile stations k, m; 1-6, 7 receive the transmitted ramps or signals s1, s2; s3, s4, s5 and separate these in the IF (IF: intermediate frequency or intermediate frequency plane) by means of iFDMA.

The ramp or the signal s5 from the mobile or receiving station 7 is optional. The receiving station 7 does not have to send its ramp, and instead can also hold this only locally. However, a further embodiment can be provided if the receiving station 7 likewise sends this signal s5 and therefore the position can also be determined by the others. In this case, the receiving station is comparable to a reference station.

In a fifth method step S5, each stationary or reference station k; 1-2 for the incoming signals of all other stationary or reference stations 2-1; k' determines the time stagger:

$$\tau_{k' \to k}(t) \quad (1.14)$$

as measurement value.

In a sixth method step S6, each reference station k; 1-6 discloses these values or time staggers $\tau_{k' \to k}(t)$ by radio data transmission, for example ZigBee, WLAN or other transmission standards.

In a seventh method step S7, the mobile or receiving station m; 7 for its part has determined the corresponding measurement values $\tau_{k' \to m}(t)$ between itself and the particular reference stations k, k'; 1, 2. The mobile or receiving station m; 7 receives the data telegrams with the values $\tau_{k_1 \to k_2}(t)$ for all pairs $k_1,k_2$ of sending reference stations 1-6.

In an eighth method step S8, the mobile station $\tau_{m,k_1,k_2}(t)$ performs a calculation for all pairs $k_1,k_2$ of sending reference stations 1-6 and thus ascertains TDOA values (TDOA: time difference of arrival) between the received signals of the reference stations 1-6, the precision of which is not compromised by the precision of the pre-synchronisation and the other discussed factors.

In a ninth method step S9 there is optionally a correction of a clock offset and/or a location identification from these TDOA values in a manner known per se, for example in accordance with Bancroft of Kalman filter.

The terms "synchronise" and "synchronisation" are also to be understood to mean embodiments that include an "indirect" synchronisation. In other words, for example only the clock offsets are included, for example without smoothing quartzes.

LIST OF REFERENCE SIGNS

1-6 reference stations
7 receiving station, in particular mobile station
8 trajectory
9 computing and/or control unit
10 computing and/or control unit
11 clock offset
$clk_k(t)$ distance in the radio channel between the stations k and m
s1-s4 signals
s5 optional signal from the receiving station
S1-S9 method steps
t time
$\tau_{m, k_1, k_2}(t)$ distance difference of the mobile station to both stationary stations
$\tau_{k \to m}$ time offset between stations k and m
$\varphi_{k \to m}$ phase between stations k and m
$\Delta\varphi_{k \to m}$ phase difference between stations k and m
$\Delta\varphi_{m, k_1, k_2}(t)$ phase difference of the relevant paths

The invention claimed is:

1. A method comprising at least two reference stations transmitting signals,
   the transmitted signals
   transmitted contemporaneously but not coherently,
   transmitted in an overlapping frequency range, and
   separable using a multiplexing method,
   wherein at least one of the at least two reference stations:
   transmits a first signal amongst the transmitted signals;
   receives a contemporaneously transmitted second signal amongst the transmitted signals, sent by another reference station amongst the at least two reference stations;
   determines at least one of a time stagger or a phase angle between the first signal and a received signal corresponding to the transmitted second signal, and
   wherein at least one receiving station receives the transmitted signals from at least two reference stations amongst the at least two reference stations.

2. The method according to claim 1, comprising processing, using a unit separate from the receiving station, at least one of the time stagger and phase angle to form a data stream or data set, which is transferred to the at least one receiving station by data transfer.

3. The method according to claim 1, wherein at least one of a time stagger or a phase angle is determined, corresponding to at least one signal that is or has been received by another station.

4. The method according to claim 1, in which measured values determined from received signals from at least three different receiving stations are used to suppress an influence by system clocks of the receiving stations, at least to a linear approximation, on determined time of arrival differences of the received signals.

5. The method according to claim 4, in which, with approximation, a Taylor series is truncated at a quadratic polynomial term, wherein a determination of a time offset or phase difference between stations is performed with times of arrival or phases added and subtracted with weights in the Taylor series approximation, and the mathematical variables in the Taylor series approximation are path lengths and path length differences.

6. The method according to claim 1, in which a clock offset of the at least one receiving station is determined relative to at least one of the at least two reference stations.

7. The method according to claim 1, in which FMCW or FSCW signals are used or formed as the transmitted signals.

8. The method according to claim 1, in which IFMDA or CDMA is applied as a multiplexing method for the transmitted signals.

9. The method according to claim 1, in which future transmissions of the at least two reference stations are controlled depending on at least one of a determined time offset or a determined phase angles.

10. The method according to claim 1, in which contemporaneous transmission of transmitted signals is performed as a temporally overlapping sending operation or sending operation between two transmissions of a respective station amongst the at least two reference stations with a rest time shorter than a duration of the channel pulse response.

11. The method according to claim 1, wherein the at least one receiving station comprises a mobile station defining a movement path, wherein the movement path is not fixed.

12. The method according to claim 1, wherein a processing unit controls future transmissions of the reference stations depending on at least one of a determined time stagger or phase angle.

13. A system, comprising:
at least two reference stations, configured to transmit signals and which each have at least one processing unit; and
at least one receiving station configured to receive the signals from at least two reference stations amongst the at least two reference stations and comprising at least one processing unit,
wherein at least one reference station amongst the at least two reference stations is configured to be controlled by at least one of the processing units to transmit a first signal amongst a plurality of transmitted signals; and
wherein at least one of the processing units is configured to control another station amongst the at least two reference stations to:
receive a contemporaneously transmitted second signal amongst the plurality of transmitted signals, the contemporaneously transmitted second signal sent by another reference station amongst the at least two reference stations; and
determine at least one of a time stagger or a phase angle between the transmitted first signal and a received signal corresponding to the contemporaneously transmitted second signal.

14. The system according to claim 13, wherein the at least one receiving station comprises a mobile station.

15. The system according to claim 13, wherein the plurality of transmitted signals comprise FMCW or FSCW signals.

16. The system according to claim 13, wherein the plurality of transmitted signals are multiplexed using an IFMDA or CDMA method.

17. The system according to claim 13, wherein at least of the processing units is configured to control transmission of transmitted signals to provide a temporally overlapping sending operation or sending operation between two transmissions of a respective station amongst the at least two reference stations with a rest time shorter than a duration of the channel pulse response.

18. A method comprising at least two reference stations transmitting signals, the transmitted signals transmitted using a temporally overlapping sending operation or a sending operation between two transmissions of a respective station amongst the at least two reference stations with a rest time shorter than a duration of the channel pulse response;
wherein at least one of the at least two reference stations:
transmits a first signal amongst the transmitted signals;
receives a contemporaneously transmitted second signal amongst the transmitted signals sent by another reference station amongst the at least two reference stations; and
determines at least one of a time stagger or a phase angle between the first signal and a received signal corresponding to the transmitted second signal, and
wherein at least one receiving station receives the transmitted signals from at least two reference stations amongst the at least two reference stations.

19. The method according to claim 18, wherein the at least one receiving station comprises a mobile station.

20. The method according to claim 18, wherein the transmitted signals comprise FMCW or FSCW signals.

* * * * *